(12) United States Patent
Kim et al.

(10) Patent No.: US 12,516,164 B2
(45) Date of Patent: Jan. 6, 2026

(54) POLYAMIDE-IMIDE-BASED FILM, PREPARATION METHOD THEREOF, AND COMPOSITE FILM AND DISPLAY DEVICE COMPRISING THE SAME

(71) Applicants: SK microworks Co., Ltd., Gyeonggi-do (KR); SK microworks solutions Co., Ltd., Chungcheongnam-do (KR)

(72) Inventors: Sun Hwan Kim, Gyeonggi-do (KR); Dae Seong Oh, Gyeonggi-do (KR); Yun-Hee Seo, Chungcheongnam-do (KR); Jin Woo Lee, Gyeonggi-do (KR)

(73) Assignees: SK MICROWORKS CO., LTD., Gyeonggi-do (KR); SK MICROWORKS SOLUTIONS CO., LTD., Chungcheongnam-do (KR)

( * ) Notice: Subject to any disclaimer, the term of this patent is extended or adjusted under 35 U.S.C. 154(b) by 769 days.

(21) Appl. No.: 17/851,966

(22) Filed: Jun. 28, 2022

(65) Prior Publication Data
US 2023/0097107 A1   Mar. 30, 2023

(30) Foreign Application Priority Data
Aug. 31, 2021  (KR) .................. 10-2021-0115990

(51) Int. Cl.
*C08J 5/18*       (2006.01)
*C08G 73/14*   (2006.01)
*G02B 1/14*     (2015.01)

(52) U.S. Cl.
CPC ............. *C08J 5/18* (2013.01); *C08G 73/14* (2013.01); *G02B 1/14* (2015.01); *C08J 2379/08* (2013.01)

(58) Field of Classification Search
None
See application file for complete search history.

(56) References Cited

U.S. PATENT DOCUMENTS

2020/0407507 A1   12/2020   Oh et al.
2020/0407522 A1   12/2020   Choi et al.
(Continued)

FOREIGN PATENT DOCUMENTS

| EP | 4036153 A1 | 8/2022 | |
| KR | 10-2020-0082203 A | 7/2020 | |
| KR | 2020/0082203 A | * 7/2020 | ................ C08J 5/18 |

OTHER PUBLICATIONS

Jeong—KR 2020-0082203 A—Euro D2—MT—polyimide film—Jul. 2020 (Year: 2020).*

(Continued)

*Primary Examiner* — John Vincent Lawler
(74) *Attorney, Agent, or Firm* — IP & T GROUP LLP

(57) ABSTRACT

The embodiments provide a polyamide-imide-based film that comprises a polyamide-imide-based polymer and has an rSE value of 0.8 to 1.25 as represented by the following Equation 1, whereby it is excellent in adhesion to a hard coating layer and light resistance to a UV light source, a process for preparing the same, and a composite film and a display device comprising the same. <Equation 1> rSE=SE1/SE2 In Equation 1, SE1 is the surface energy (dyne/cm) of a first side of the film, and SE2 is the surface energy (dyne/cm) of a second side of the film.

11 Claims, 2 Drawing Sheets

(56) References Cited

U.S. PATENT DOCUMENTS

2021/0047485 A1  2/2021  Kim et al.
2021/0095120 A1* 4/2021  Jeon .................. C08G 73/1067

OTHER PUBLICATIONS

Yingxian Duo et al., Nanoplastic Technology, 478-479 (2006), Zhejiang Science and Technology Press; and English Translations for portions marked in red box of the article.
Yunqing Wang, Pharmaceutical Process Equipment for Pharmaceutical Majors, 30 (2009), China Agricultural University Press; and English Translations for portions marked in red box of the article.
Binshi Xu, Material Surface Engineering, 120 (2014), Harbin Institute of Technology Press; and English Translations for portions marked in red box of the article.
Office Action for the Chinese Patent Application No. 202211046738.2 issued by the Chinese Patent Office on Sep. 20, 2023.
Extended European Search Report for the European Patent Application No. 22192270.1 issued by the European Patent Office on Jan. 19, 2023.

* cited by examiner

POLYAMIDE-IMIDE-BASED FILM, PREPARATION METHOD THEREOF, AND COMPOSITE FILM AND DISPLAY DEVICE COMPRISING THE SAME

CROSS-REFERENCE TO RELATED APPLICATION

This application claims benefit of priority to Korean Patent Application No. 10-2021-0115990 filed on Aug. 31, 2021 in the Korean Intellectual Property Office, the disclosure of which is incorporated herein by reference in its entirety.

TECHNICAL FIELD

Embodiments relate to a polyamide-imide-based film, to a process for preparing the same, and to a composite film and a display device comprising the same.

BACKGROUND ART

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. Further, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

When such a polyimide-based film is applied to a cover window or a display device, a hard coating layer should be attached to enhance the surface hardness of the film, and the manufactured display device is inevitably used in an environment exposed to a UV light source.

Accordingly, there has been a continuous demand for the development of a film with improved adhesion to a hard coating layer and light resistance to UV light sources.

DETAILED DESCRIPTION OF THE INVENTION

Technical Problem

An object of the embodiments is to provide a polyamide-imide-based film that is excellent in adhesion to a hard coating layer and light resistance to UV light sources, a process for preparing the same, and a composite film and a display device comprising the same.

Solution to the Problem

An embodiment provides a polyamide-imide-based film, which comprises a polyamide-imide-based polymer and has an rSE value of 0.8 to 1.25 as represented by the following Equation 1.

$$rSE = SE1/SE2 \qquad \text{<Equation 1>}$$

In Equation 1, SE1 is the surface energy (dyne/cm) of a first side of the film, and SE2 is the surface energy (dyne/cm) of a second side of the film.

Another embodiment provides a polyamide-imide-based composite film, which comprises a polyamide-imide-based film and a functional layer, wherein the polyamide-imide-based film comprises a polyamide-imide-based polymer and has an rSE value of 0.8 to 1.25 as represented by the above Equation 1.

Still another embodiment provides a display device, which comprises a display unit; and a cover window disposed on the display unit, wherein the cover window comprises a polyamide-imide-based film and a functional layer, and the polyamide-imide-based film comprises a polyamide-imide-based polymer and has an rSE value of 0.8 to 1.25 as represented by the above Equation 1.

An embodiment provides a process for preparing a polyamide-imide-based film, which comprises polymerizing a diamine compound, a dianhydride compound, and a dicarbonyl compound in an organic solvent to prepare a polyamide-imide-based polymer solution; casting the solution and then drying it to prepare a gel sheet; and thermally treating the gel sheet, wherein the process comprises, before casting the polyamide-imide-based polymer solution, stirring the solution.

Advantageous Effects of the Invention

As the polyamide-imide-based film according to the embodiments has an rSE value in a predetermined range, it exhibits excellent light resistance, whereby its quality of appearance is uniform, and it can have excellent mechanical properties and optical properties.

In particular, once the polyamide-imide-based film has been prepared, it is subjected to a post-process such as a process in which a functional layer such as a hard coating layer is laminated for imparting functions such as anti-fingerprint, antistatic, scattering prevention, and adhesion enhancement. In such an event, it is possible to obtain a polyamide-imide-based film that is excellent in adhesion to the functional layer.

As the rSE value of the polyamide-imide-based film according to an embodiment is controlled to a specific range, quality reliability and product yield of a final product such as a cover window for a display device or a display device to which the film has been applied can be enhanced.

BRIEF DESCRIPTION OF THE DRAWINGS

FIG. 4 is a schematic flow diagram of a process for preparing a polyamide-imide-based film according to an embodiment.

BEST MODE FOR CARRYING OUT THE INVENTION

Figure 1:
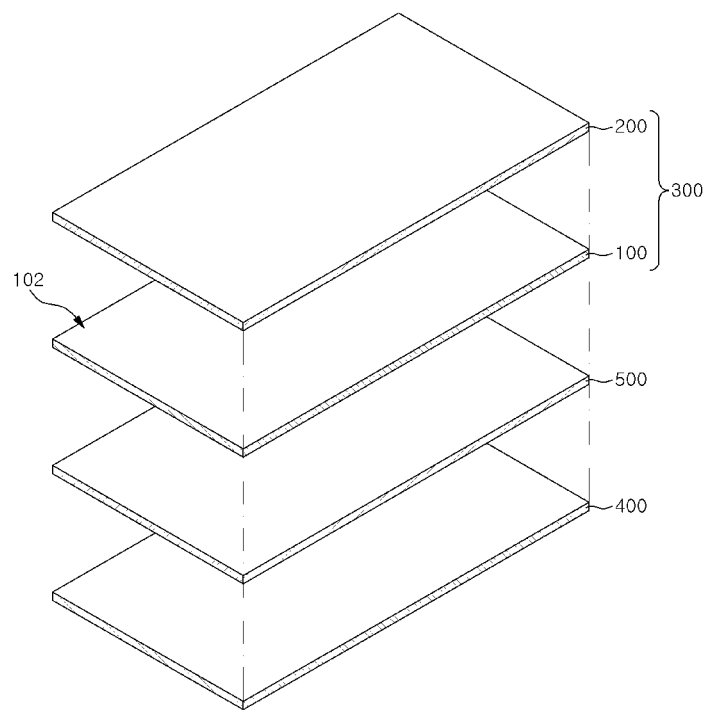
FIG. 1 is a schematic exploded view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Imide-Based Film

An embodiment provides a polyamide-imide-based film that has an rSE value in a predetermined range, whereby it is excellent in adhesion to a functional layer and light resistance to UV light sources, and it is possible to enhance the quality reliability and product yield of a final product.

The polyamide-imide-based film according to an embodiment comprises a polyamide-imide-based polymer.

The polyamide-imide-based film has an rSE value of 0.8 to 1.25 as represented by the following Equation 1.

$$rSE = SE1/SE2 \qquad \text{<Equation 1>}$$

In Equation 1, SE1 is the surface energy (dyne/cm) of a first side of the film, and SE2 is the surface energy (dyne/cm) of a second side of the film.

Figure 3:
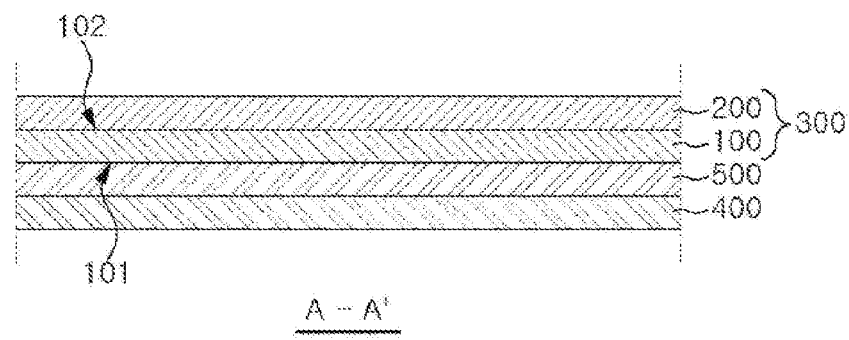
FIG. 3 is a schematic cross-sectional view of a display device according to an embodiment.
Figure 3:
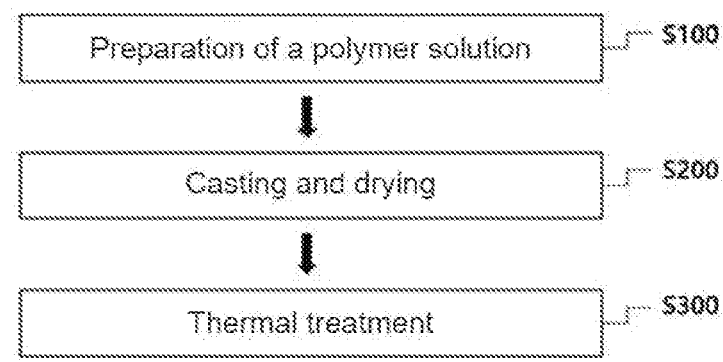

FIG. 3 is a schematic cross-sectional view of a display device according to an embodiment. Specifically, FIG. 3 illustrates a polyimide-imide-based film (100) that comprises a first side (101) and a second side (102) opposite to the first side (101).

The first side may be a side that comes into direct contact with the casting body for casting the polyamide-imide-based polymer solution in the process for preparing a polyamide-imide-based film. Specifically, the first side may be a belt side that comes into contact with the casting body, for example, a belt when the polyimide-imide-based polymer solution is cast.

The second side may be a side that does not come into direct contact with the casting body for casting the polyamide-imide-based polymer solution in the process for preparing a polyamide-imide-based film. Specifically, the second side may be an air side that comes into contact with the air when the polyamide-imide-based polymer solution is cast.

Specifically, the rSE value of the polyamide-imide-based film as represented by Equation 1 may be 0.8 or more, 0.85 or more, 0.90 or more, 0.92 or more, 0.93 or more, 0.95 or more, or 0.96 or more, and it may be 1.25 or less, 1.20 or less, 1.15 or less, 1.12 or less, 1.10 or less, 1.08 or less, 1.07 or less, 1.05 or less, or 1.03 or less.

As the rSE value of the polyamide-imide-based film is controlled to the above range, when it is subjected to a post-process such as a process for laminating a functional layer, adhesion to the functional layer is enhanced; thus, the phenomenon of delamination between layers when it is applied to a product can be significantly reduced.

On the other hand, if the rSE value of the polyamide-imide-based film according to an embodiment is outside the above range, adhesion to a functional layer is deteriorated, in particular, once a functional layer has been formed and exposed to UV rays, its adhesion may be steeply deteriorated. Thus, its quality reliability is deteriorated, resulting in products with a high defect rate.

The polyamide-imide-based film may have an SE1 of 35 dynes/cm to 60 dynes/cm.

SE1 is the surface energy of a first side of the polyamide-imide-based film. Specifically, it may be the surface energy of the belt side of the polyamide-imide-based film.

Specifically, SE1 of the polyamide-imide-based film may be 35 dynes/cm or more, 38 dynes/cm or more, 40 dynes/cm or more, or 41 dynes/cm or more, and it may be 60 dynes/cm or less, 55 dynes/cm or less, 50 dynes/cm or less, 47 dynes/cm or less, or 45 dynes/cm or less.

The polyamide-imide-based film may have an SE2 of 35 dynes/cm to 60 dynes/cm.

SE2 is the surface energy of a second side of the polyamide-imide-based film. Specifically, it may be the surface energy of the air side of the polyamide-imide-based film.

Specifically, SE2 of the polyamide-imide-based film may be 35 dynes/cm or more, 38 dynes/cm or more, 40 dynes/cm or more, or 41 dynes/cm or more, and it may be 60 dynes/cm or less, 55 dynes/cm or less, 50 dynes/cm or less, or 46 dynes/cm or less.

The polyamide-imide-based film has a dAp value of 8° or less as represented by the following Equation 2.

$$dAp(°) = |Ap2 - Ap1| \qquad \text{<Equation 2>}$$

In Equation 2, Ap1 is the contact angle (°) of water to the first side of the film, and Ap2 is the contact angle (°) of water to the second side of the film.

For example, Ap1 may be the contact angle (°) of water to the belt side of the film, and Ap2 may be the contact angle (°) of water to the air side of the film.

Specifically, the dAp value may be 7.5° or less, 7° or less, 6.5° or less, 6° or less, or 5.5° or less, and it may be 0° or more or 0.1° or more.

The contact angle (Ap1) of water to the first side of the polyamide-imide-based film is 60° to 83°.

Specifically, Ap1 may be 60° or more, 63° or more, 65° or more, 68° or more, 70° or more, 72° or more, or 74° or more, and it may be 83° or less, 82° or less, 81° or less, or 80° or less.

The contact angle (Ap2) of water to the second side of the polyamide-imide-based film is 60° to 85°.

Specifically, Ap2 may be 60° or more, 63° or more, 65° or more, 67° or more, 70° or more, 72° or more, or 73° or more, and it may be 85° or less, 83° or less, or 81° or less.

The polyamide-imide-based film has a dAd value of 13° or less as represented by the following Equation 3.

$$dAd(°) = |Ad2 - Ad1| \qquad \text{<Equation 3>}$$

Ad1 is the contact angle (°) of diiodomethane to the first side of the film, and Ad2 is the contact angle (°) of diiodomethane to the second side of the film.

For example, Ad1 may be the contact angle (°) of diiodomethane to the belt side of the film, and Ad2 may be the contact angle (°) of diiodomethane to the air side of the film.

Specifically, the dAd value may be 12° or less, 10° or less, 8° or less, 7° or less, 5° or less, 4° or less, 3° or less, or 2.5° or less, and it may be 0.2° or more, 0.3° or more, or 0.5° or more.

The contact angle (Ad1) of diiodomethane to the first side of the polyamide-imide-based film is 30° to 50°.

Specifically, Ad1 may be 30° or more, 33° or more, 35° or more, 37° or more, or 38° or more, and it may be 50° or less, 48° or less, 47° or less, or 45° or less.

The contact angle (Ad2) of diiodomethane to the second side of the polyamide-imide-based film is 30° to 55°.

Specifically, Ad2 may be 30° or more, 33° or more, 35° or more, 37° or more, or 40° or more, and it may be 55° or less, 53° or less, 50° or less, 48° or less, 47° or less, or 45° or less.

When the polyamide-imide-based film is subjected to the cross-hatch test, the adhesion between the film and the hard coating layer is 5 B or more. When the film is irradiated with a UV ray having a wavelength of 340 nm at a dose of 0.63 W/m² and a temperature of 60° C. for 72 hours and then subjected to the cross-hatch test, the adhesion between the film and the hard coating layer is 4 B or more.

If the adhesion according to the cross-hatch test before and after UV irradiation satisfies the above range, when the film is applied to a display device, the phenomenon that the coating layer is delaminated does not take place even upon being exposed to a backlight such as OLED or LCD or outdoor sunlight. That is, as the polyamide-imide-based film achieves excellent adhesion to a coating layer, as well as excellent light resistance, it is possible to enhance the quality reliability of a final product.

According to an embodiment, the polyamide-imide-based film may have a transmittance of 80% or more. For example, the transmittance may be 85% or more, 88% or more, and it may be 100% or less or 99% or less.

The polyamide-imide-based film has a haze of 1% or less. Specifically, the haze may be 0.8% or less, 0.7% or less, or 0.6% or less, but it is not limited thereto.

The polyamide-imide film has a yellow index of 4 or less. For example, the yellow index may be 3.8 or less, 3.5 or less, 3.0 or less, or 2.8 or less, but it is not limited thereto.

The polyamide-imide-based film may have a surface hardness of HB or higher. Specifically, the surface hardness may be H or higher, or 2H or higher, but it is not limited thereto.

The polyamide-imide-based film may have a tensile strength of 15 kgf/mm² or more. Specifically, the tensile strength may be 18 kgf/mm² or more, 20 kgf/mm² or more, 21 kgf/mm² or more, or 22 kgf/mm² or more, but it is not limited thereto.

When the polyamide-imide-based film based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-imide-based film satisfies the above range, it can be advantageously applied to a foldable display device or a flexible display device.

The polyamide-imide-based film may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-imide-based film satisfies the above range, it may be advantageous for achieving luminance conditions or a sense of texture preferable for the application thereof to a display device.

The content of residual solvents in the polyamide-imide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-imide-based film exceeds the above range, the durability of the film may be deteriorated, and it may have an impact on the quality deviation of the film. In particular, since it affects the mechanical strength, it may adversely affect the post-processing of the film. Since the hygroscopicity of the film is accelerated, optical properties and thermal resistance, let alone the mechanical properties, may be deteriorated as well.

The polyamide-imide-based film according to an embodiment comprises a polyamide-imide-based polymer, which is prepared by polymerizing a diamine compound, a dianhydride compound, and a dicarbonyl compound.

The polyamide-imide-based polymer is a polymer that contains an imide repeat unit and an amide repeat unit.

Specifically, the polyamide-imide-based polymer comprises an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N\text{-}(E)_e\text{-}NH_2 \quad \text{[Formula 1]}$$

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

*—(CH$_3$)$_n$—*    1-14a (n is sequenced from integers of 1 to 12)

Specifically, $(E)_e$ in Formula 1 may be selected from the groups represented by the following Formulae 1-1b to 1-13b, but it is not limited thereto.

-continued

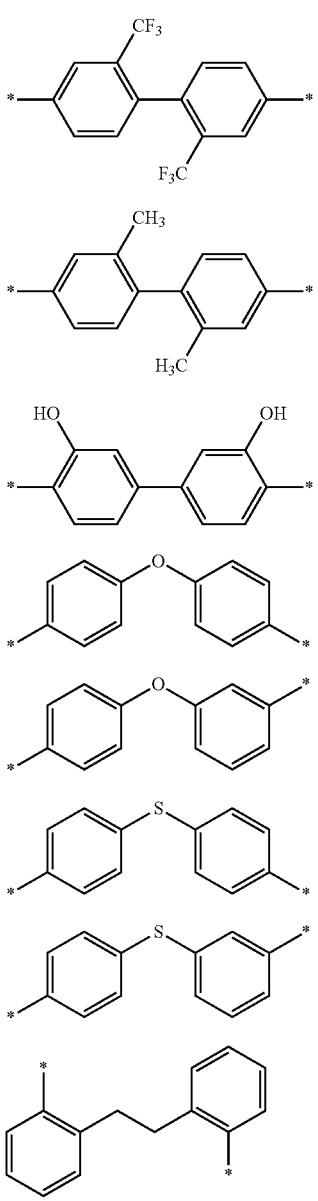

1-6b
1-7b
1-8b
1-9b
1-10b
1-11b
1-12b
1-13b

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In some embodiments, the diamine compound may comprise one kind of diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

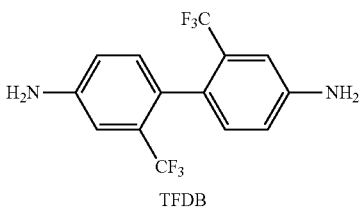

TFDB

The dianhydride compound has a low birefringence value, so that it can contribute to enhancements in the optical properties such as transmittance of a film that comprises the polyamide-imide-based polymer.

The dianhydride compound is not particularly limited, but it may be, for example, an aromatic dianhydride compound that contains an aromatic structure. For example, the aromatic dianhydride compound may be a compound represented by the following Formula 2.

[Formula 2]

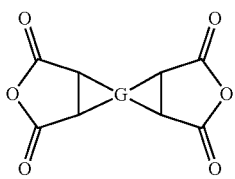

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

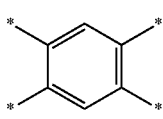

2-1a

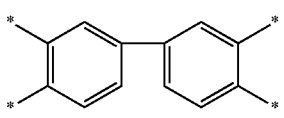

2-2a

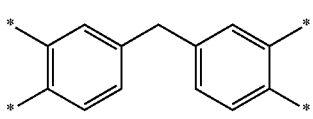

2-3a

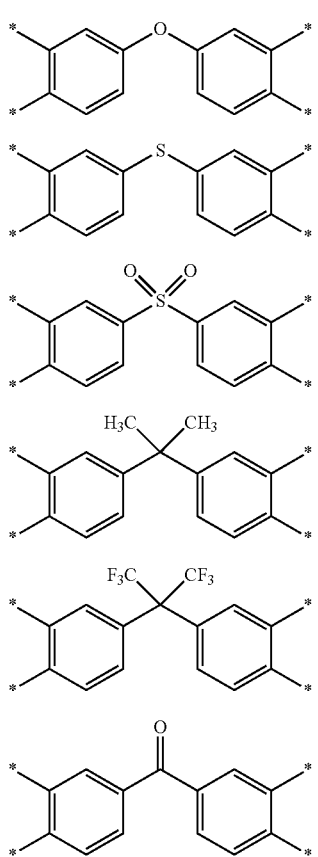

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise at least one selected from the group consisting of 2,2'-bis-(3,4-dicarboxyphenyl) hexafluoropropane dianhydride (6FDA) and 3,3',4,4'-biphenyltetracarboxylic dianhydride (BPDA), which have the following structures, but it is not limited thereto.

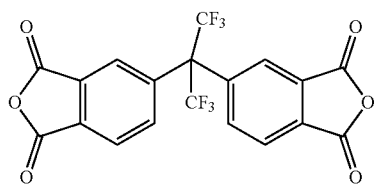

6-FDA

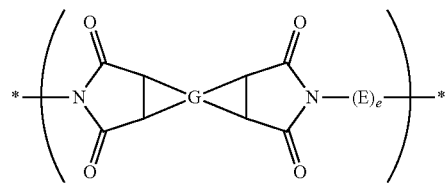

BPDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

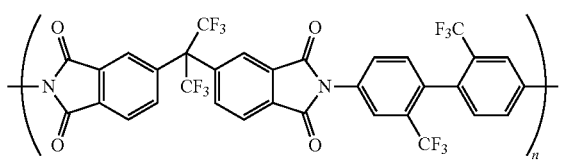

In Formula A, E, G, and e are as described above.

For example, the polyimide may comprise a repeat unit represented by the following Formula A-1, but it is not limited thereto.

[Formula A-1]

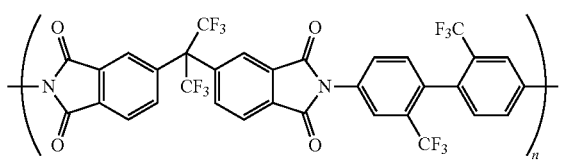

In Formula A-1, n is an integer of 1 to 400.

The dicarbonyl compound is not particularly limited, but it may be, for example, a compound represented by the following Formula 3.

[Formula 3]

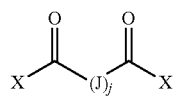

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

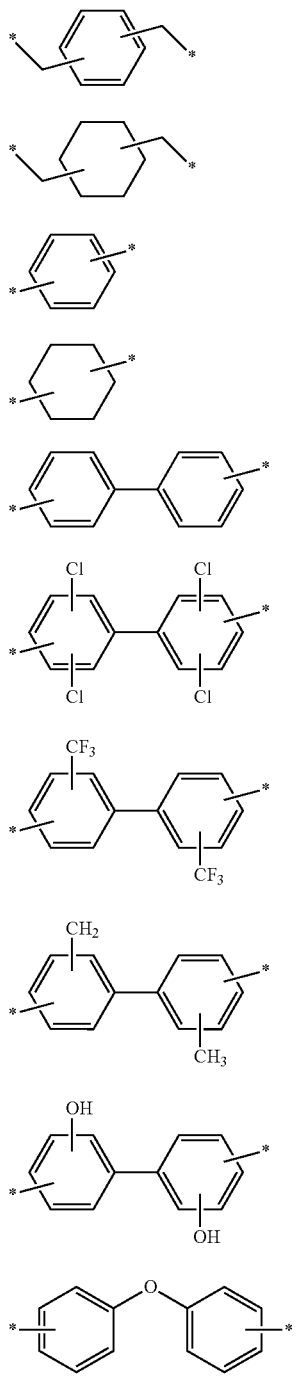

3-1a 3-2a 3-3a 3-4a 3-5a 3-6a 3-7a 3-8a 3-9a 3-10a

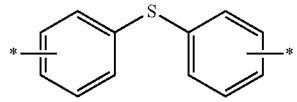

3-11a

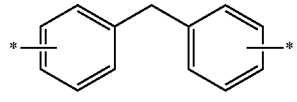

3-12a

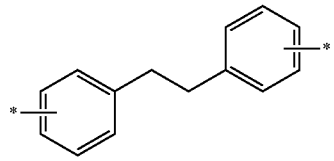

3-13a 3-14a

*—(CH$_2$)$_n$—*

(n is sequenced from integers of 1 to 12)

Specifically, (J)$_j$ in the above Formula 3 may be selected from the groups represented by the following Formulae 3-1b to 3-8b, but it is not limited thereto.

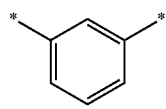

3-1b

3-2b

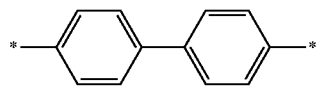

3-3b

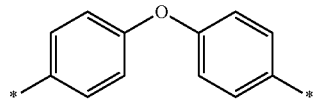

3-4b 2-5b

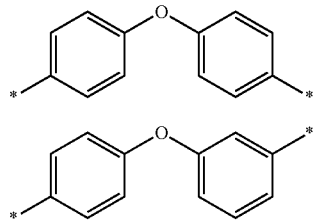

3-6b

3-7b

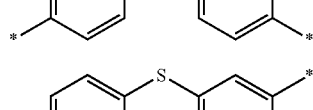

3-8b

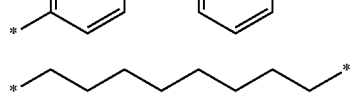

More specifically, (J)$_j$ in Formula 3 may be the group represented by the above Formula 3-1b, the group represented by the above Formula 3-2b, the group represented by the above Formula 3-3b, or the group represented by the above Formula 3-8b.

For example, $(J)_j$ in the above Formula 3 may be the group represented by the above Formula 3-1b or the group represented by the above Formula 3-2b.

In an embodiment, one kind of a dicarbonyl compound may be used alone, or a mixture of at least two kinds of dicarbonyl compounds different from each other may be used, as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

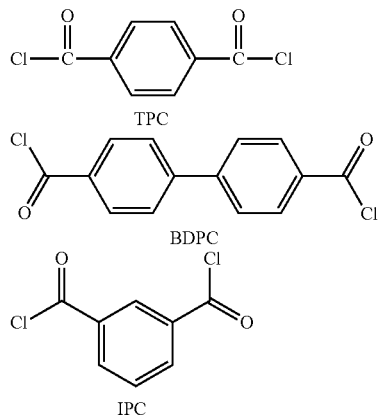

The diamine compound and the dicarbonyl compound may be polymerized to form a repeat unit represented by the following Formula B.

[Formula B]

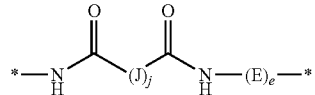

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

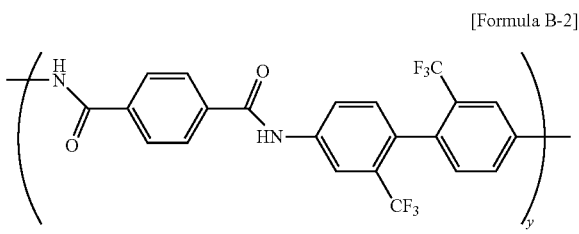

In Formula B-1, x is an integer of 1 to 400.

[Formula B-2]

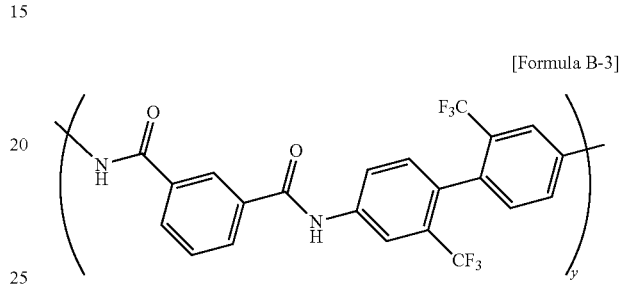

In Formula B-2, y is an integer of 1 to 400.

[Formula B-3]

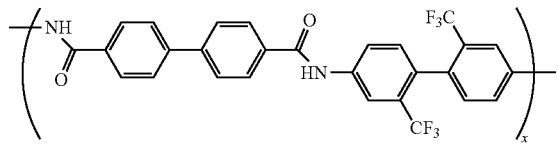

In Formula B-3, y is an integer of 1 to 400.

According to an embodiment, the polyamide-imide-based polymer may comprise a repeat unit represented by the following Formula A and a repeat unit represented by the following Formula B:

[Formula A]

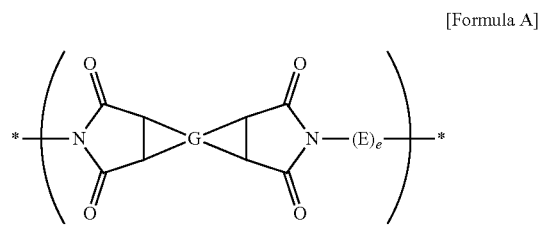

[Formula B]

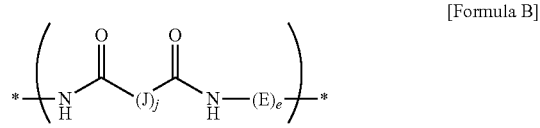

In Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a substituted or unsubstituted tetravalent $C_6$-$C_{30}$ aliphatic cyclic group, a substituted or unsubstituted tetravalent C$_4$-C$_{30}$ heteroaliphatic cyclic group, a substituted or unsubstituted tetravalent C$_6$-C$_{30}$ aromatic cyclic group, or a substituted or unsubstituted tetravalent C$_4$-C$_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted C$_1$-C$_{30}$ alkylene group, a substituted or unsubstituted C$_2$-C$_{30}$ alkenylene group, a substituted or unsubstituted C$_2$-C$_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

The polyamide-imide-based polymer may comprise an imide-based repeat unit and an amide-based repeat unit at a molar ratio of 2:98 to 70:30.

Specifically, the molar ratio of the imide repeat unit to the amide repeat unit in the polyamide-imide-based polymer may be 2:98 to 60:40, 5:95 to 55:45, 5:95 to 50:50, 5:95 to 45:55, or 7:93 to 45:55, but it is not limited thereto.

If the molar ratio of the imide repeat unit to the amide repeat unit is within the above range, it is possible to effectively control the rSE value of the polyamide-imide-based film and to enhance the quality reliability of the film in combination with the characteristic processing method.

In the polyamide-imide-based polymer, the molar ratio of the repeat unit represented by the above Formula A to the repeat unit represented by the above Formula B may be 2:98 to 70:30. Specifically, the molar ratio of the repeat unit represented by the above Formula A to the repeat unit represented by the above Formula B may be 2:98 to 60:40, 5:95 to 60:40, 60:40, 5:95 to 55:45, 5:95 to 50:50, 5:95 to 45:55, or 7:93 to 45:55, but it is not limited thereto.

The polyamide-imide-based film according to an embodiment may further comprise at least one selected from the group consisting of a filler, a blue pigment, and a UVA absorbent in addition to the polyamide-imide-base polymer.

The filler may comprise, for example, an oxide, a carbonate, or a sulfate of metal or metalloid. For example, the filler may comprise silica, calcium carbonate, barium sulfate, or the like, but it is not limited thereto.

The filler may be employed in the form of particles. In addition, the surface of the filler is not subjected to special coating treatment, and it may be uniformly dispersed in the entire film.

As the polyamide-imide-based film comprises the filler, it is possible to secure a wide angle of view without a deterioration in the optical properties of the film and to enhance not only the roughness and windability but also the effect of improving the scratches caused by sliding in the preparation of the film.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to nx, ny, and nz can be appropriately adjusted, and the luminance of the film at various angles can be improved.

On the other hand, if the refractive index of the filler is outside the above range, there may arise a problem in that the filler is visually noticeable on the film or that the haze is increased due to the filler.

The content of the filler may be 100 ppm to 15,000 ppm based on the total weight of the solids content of the polyamide-imide-based polymer. Specifically, the content of the filler may be 100 ppm or more, 300 ppm or more, 500 ppm or more, 700 ppm or more, 800 ppm or more, or 1,000 ppm or more, and it may be 15,000 ppm or less, 12,000 ppm or less, 10,000 ppm or less, 8,000 ppm or less, 6,000 ppm or less, 5,000 ppm or less, 3,000 ppm or less, 2,500 ppm or less, 2,000 ppm or less, or 1,500 ppm or less, based on the total weight of the solids content of the polyamide-imide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The filler may have a diameter (D50) of 50 nm to 1,000 nm as dissolved in an organic solvent (e.g., DMAc). Specifically, the diameter (D50) of the filler as dissolved in an organic solvent may be 50 nm or more, 70 nm or more, 80 nm or more, or 100 nm or more, and it may be 1,000 nm or less, 800 nm or less, 700 nm or less, 500 nm or less, 400 nm or less, 300 nm or less, 250 nm or less, 220 nm or less, or 200 nm or less. More specifically, it may be 50 nm to 300 nm, 50 nm to 250 nm, 80 nm to 250 nm, 80 nm to 220 nm, 100 nm to 220 nm, or 100 nm to 200 nm.

The blue pigment may comprise OP-1300A manufactured by Toyo, but it is not limited thereto.

In some embodiments, the blue pigment may be employed in an amount of 50 to 5,000 ppm based on the total weight of the polyamide-imide-based polymer. Preferably, the blue pigment may be employed in an amount of 100 to 5,000 ppm, 200 to 5,000 ppm, 300 to 5,000 ppm, 400 to 5,000 ppm, 50 to 3,000 ppm, 100 to 3,000 ppm, 200 to 3,000 ppm, 300 to 3,000 ppm, 400 to 3,000 ppm, 50 to 2,000 ppm, 100 to 2,000 ppm, 200 to 2,000 ppm, 300 to 2,000 ppm, 400 to 2,000 ppm, 50 to 1,000 ppm, 100 to 1,000 ppm, 200 to 1,000 ppm, 300 to 1,000 ppm, or 400 to 1,000 ppm, based on the total weight of the polyamide-imide-based polymer, but it is not limited thereto.

The UVA absorber may comprise an absorber that absorbs electromagnetic waves of a wavelength of 10 to 400 nm used in the art. For example, the UVA absorber may comprise a benzotriazole-based compound. The benzotriazole-based compound may comprise an N-phenolic benzotriazole-based compound. In some embodiments, the N-phenolic benzotriazole-based compound may comprise N-phenolic benzotriazole in which the phenol group is substituted with an alkyl group having 1 to 10 carbon atoms. It may be substituted with two or more of the alkyl group, which may be linear, branched, or cyclic.

In some embodiments, the UVA absorber may be employed in an amount of 0.1 to 10% by weight based on the total weight of the polyamide-imide-based polymer. Preferably, the UVA absorber may be employed in an amount of 0.1 to 5% by weight, 0.1 to 3% by weight, 0.1 to 2% by weight, 0.5 to 10% by weight, 0.5 to 5% by weight, 0.5 to 3% by weight, 0.5 to 2% by weight, 1 to 10% by weight, 1 to 5% by weight, 1 to 3% by weight, or 1 to 2% by weight, relative to the total weight of the polyamide-imide-based polymer, but it is not limited thereto.

The physical properties of the polyamide-imide-based film as described above are based on a thickness of 40 μm to 60 μm. For example, the physical properties of the polyamide-imide film are based on a thickness of 50 μm. The polyamide-imide-based film has a thickness deviation of 3 μm or less or 2 μm or less based on a thickness of 50 μm. In addition, the thickness deviation rate may be 5% or less, 4% or less, or 3% or less, but it is not limited thereto.

The thickness of the film was measured at 5 random points using a digital micrometer 547-401 manufactured by Mitutoyo Corporation. Their average value was adopted as the thickness.

The features on the components and properties of the polyamide-imide-based film as described above may be combined with each other.

In addition, the rSE value, SE1, SE2, dAp, Ap1, Ap2, dAd, Ad1, Ad2, and the like of the polyamide-imide-based film as described above may be adjusted by combinations of the chemical and physical properties of the components, which constitute the polyamide-imide-based film, along with the specific conditions in each step of the process for preparing the polyamide-imide-based film as described below.

For example, the compositions and contents of the components that constitute the polyamide-imide-based film, the polymerization conditions, stirring conditions, and thermal treatment conditions in the film preparation process, and the like are all combined to achieve an rSE value in a desired range.

Polyamide-Imide-Based Composite Film

The polyamide-imide-based composite film according to an embodiment comprises a polyamide-imide-based film and a functional layer.

The polyamide-imide-based film comprises a polyamide-imide-based polymer and has an rSE value of 0.8 to 1.25 as represented by the above Equation 1.

Details on the polyamide-imide-based film are as described above.

In an embodiment, the functional layer comprises a hard coating layer, and when it is subjected to the cross-hatch test, the adhesion between the polyamide-imide-based film and the hard coating layer is 5 B or more. When the polyamide-imide-based film is irradiated with a UV ray having a wavelength of 340 nm at a dose of 0.63 W/m$^2$ and a temperature of 60° C. for 72 hours and then subjected to the cross-hatch test, the adhesion between the polyamide-imide-based film and the hard coating layer is 4 B or more.

The functional layer (200) may comprise an organic resin.

In addition, the functional layer (200) may further comprise a filler.

The functional layer (200) may further comprise other additives.

The organic resin may be a curable resin. The organic resin may be a binder resin. The organic resin may be at least one selected from the group consisting of an acrylate-based monomer, a urethane acrylate-based oligomer, and an epoxy acrylate-based oligomer.

The acrylate-based monomer may be at least one selected from the group consisting of a substituted or unsubstituted acrylate and a substituted or unsubstituted methacrylate.

The acrylate-based monomer may contain 1 to 10 functional groups. The urethane acrylate-based oligomer may contain 2 to 15 functional groups. The epoxy acrylate-based oligomer may contain 1 to 10 functional groups.

Examples of the acrylate-based monomers include trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

The acrylate-based monomer may have a weight average molecular weight (Mw) of about 200 to about 2,000 g/mole, about 200 to about 1,000 g/mole, or about 200 to about 500 g/mole.

The acrylate equivalent weight of the acrylate-based monomer may range from about 50 to about 300 g/eq., from about 50 to about 200 g/eq., or from about 50 to about 150 g/eq.

Examples of the urethane acrylate-based oligomer include a bifunctional urethane acrylate oligomer having a weight average molecular weight of 1,400 to 25,000, a trifunctional urethane acrylate oligomer having a weight average molecular weight of 1,700 to 16,000, a tetra-functional urethane acrylate oligomer having a weight average molecular weight of 500 to 3,500, a hexa-functional urethane acrylate oligomer having a weight average molecular weight of 818 to 2,600, an ennea-functional urethane acrylate oligomer having a weight average molecular weight of 3,500 to 5,500, a deca-functional urethane acrylate oligomer having a weight average molecular weight of 3,200 to 3,900, and a pentakai-deca-functional urethane acrylate oligomer having a weight average molecular weight of 2,300 to 20,000.

Examples of the epoxy acrylate-based oligomer include a monofunctional epoxy acrylate oligomer having a weight average molecular weight of 100 to 300, a bifunctional epoxy acrylate oligomer having a weight average molecular weight of 250 to 2,000, and a tetra-functional epoxy acrylate oligomer having a weight average molecular weight of 1,000 to 3,000.

The epoxy equivalent weight of the epoxy acrylate-based oligomer may range from about 50 to about 300 g/eq, from about 50 to about 200 g/eq, or from about 50 to about 150 g/eq.

The content of the organic resin may be 30% by weight to 100% by weight based on the total weight of the functional layer. Specifically, the content of the organic resin may be 40% by weight to 90% by weight, 50% by weight to 90% by weight, or 50% by weight to 80% by weight, based on the total weight of the functional layer.

Examples of the filler contained in the functional layer include silica, barium sulfate, zinc oxide, and alumina.

The content of the filler may be 40,000 to 300,000 ppm based on the total weight of the functional layer. Specifically, the content of the filler may be 40,000 to 250,000 ppm, 50,000 to 250,000 ppm, 50,000 to 240,000 ppm, or 70,000 to 240,000 ppm, based on the total weight of the functional layer, but it is not limited thereto.

The filler may have a particle diameter of 5 nm to 100 nm. Specifically, the particle diameter of the filler may be 5 nm to 80 nm, 5 nm to 60 nm, 5 nm to 50 nm, 5 nm to 30 nm, 5 nm to 20 nm, or 10 nm to 15 nm.

The filler may be subjected to surface treatment. The filler may be subjected to surface treatment with a silane coupling agent or the like. Examples of the silane coupling agent include (meth)acrylsilane, methacroxysilane, vinylsilane, epoxysilane, and mercaptosilane.

Specifically, the filler may be a silica-based material, and the average particle diameter thereof may be 5 nm to 100 nm, for example, 10 nm to 15 nm, but it is not limited thereto.

When the functional layer comprises the filler, it is possible to not only enhance the surface hardness of the polyamide-imide-based composite film, but also affect the surface roughness and light path, thereby reducing the rainbow phenomenon and achieving an appropriate surface texture.

In an embodiment, in the polyamide-imide-based composite film, the polyamide-imide-based film may further comprise a first filler, and the functional layer may further comprise a second filler.

Specifically, the first filler and the second filler may be the same or different.

The functional layer may further comprise a photoinitiator.

Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. The photoinitiator may be used alone or in combination of two or more different types.

The functional layer may comprise a surfactant, a UV absorber, a UV stabilizer, an anti-yellowing agent, a leveling agent, an antifouling agent, or a dye for improving chromaticity values as other additives. In addition, the additives may be variously adjusted within a range that does not impair the physical properties of the functional layer. For example, the content of the additives may be about 0.01% by weight to about 10% by weight based on the total weight of the functional layer, but it is not limited thereto.

The surfactant may be a mono- to bifunctional fluorine-based acrylate, a fluorine-based surfactant, or a silicone-based surfactant. The surfactant may be employed in a form dispersed or crosslinked in the functional layer.

Examples of the UV absorber include benzophenone-based compounds, benzotriazole-based compounds, and triazine-based compounds. Examples of the UV stabilizer include tetramethyl piperidine and the like.

A coating composition may be prepared in order to form the functional layer. The coating composition comprises the organic resin, the filler, the additives, and an organic solvent.

Examples of the organic solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the organic solvent is not particularly limited since it may be variously adjusted within a range that does not impair the physical properties of the coating composition. The organic solvent may be employed such that the weight ratio of the solids content of the components contained in the coating composition to the organic solvent may be about 30:70 to about 99:1. If the content of the organic solvent is within the above range, the composition may have appropriate flowability and coatability.

Since the organic solvent is used in the course of preparing the functional layer, a trace amount of the organic solvent may remain in the functional layer.

Specifically, the coating composition may comprise an organic resin and a filler.

The filler may be employed in the form of a sol dispersed in a solvent. For example, the filler is silica, and the silica may be employed in the form of a silica sol.

The coating composition may comprise a sol in which an organic resin and a filler are dispersed at a weight ratio of 90:10 to 40:60, 85:15 to 40:60, or 85:15 to 50:50, but it is not limited thereto.

The coating composition may be applied to the front or rear side of the polyamide-imide-based film. The coating composition may be coated by a bar coating method, a knife coating method, a roll coating method, a blade coating method, a die coating method, a microgravure coating method, a comma coating method, a slot die coating method, a lip coating method, or a solution casting method.

Thereafter, the organic solvent contained in the coating composition may be removed. The organic solvent may be removed by evaporation.

Thereafter, the coating composition layer may be cured by light and/or heat.

The functional layer upon complete curing thereof may have a thickness of about 2 μm or more, or about 3 μm or more, for example, about 2 to about 20 μm, about 2 to about 15 μm, about 2 to about 10 μm, or about 3 to about 10 μm.

An additional layer may be further interposed between the polyamide-imide-based film and the functional layer. The additional layer may be an antistatic layer, which performs an antistatic function, or may be a low refractive index layer, which performs a low reflection function. Alternatively, the functional layer itself may perform an antistatic function and/or a low reflection function.

In addition, the functional layer has a refractive index of 1.45 to 1.60. Specifically, the refractive index of the functional layer may be 1.46 to 1.58, 1.46 to 1.55, 1.46 to 1.52, 1.48 to 1.51, or 1.49 to 1.51, but it is not limited thereto.

As the refractive index of the functional layer satisfies the above range, an excellent reflective appearance of the film may be achieved.

The features on the components and properties of the functional layer as described above may be combined with each other.

Cover Window for a Display Device

The cover window for a display device according to an embodiment comprises a polyamide-imide-based film and a functional layer.

The polyamide-imide-based film comprises a polyamide-imide-based polymer and has an rSE value of 0.8 to 1.25 as represented by the above Equation 1.

Details on the polyamide-imide-based film are as described above.

The cover window for a display device can be advantageously applied to a display device.

Display Device

The display device according to an embodiment comprises a display unit; and a cover window disposed on the display unit, wherein the cover window comprises a polyamide-imide-based film and a functional layer.

The polyamide-imide-based film comprises a polyamide-imide-based polymer and has an rSE value of 0.8 to 1.25 as represented by the above Equation 1.

Details on the polyamide-imide-based film and the cover window are as described above.

Figure 2:
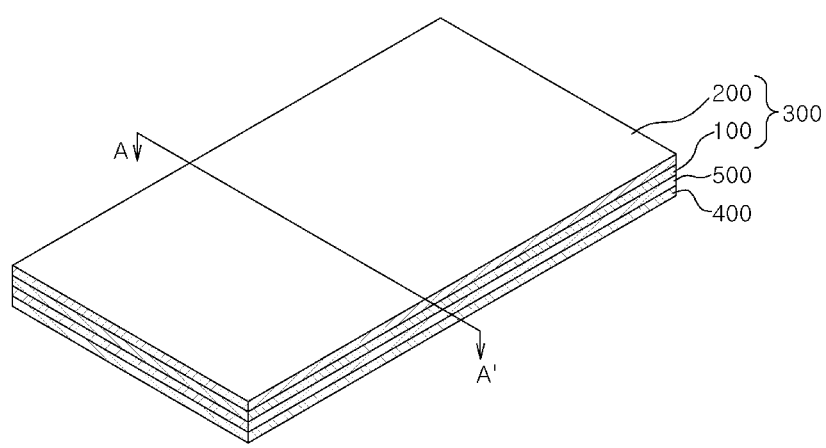
FIG. 2 is a schematic perspective view of a display device according to an embodiment.

FIG. 1 is a schematic exploded view of a display device according to an embodiment. FIG. 2 is a schematic perspective view of a display device according to an embodiment.

FIG. 3 is a schematic cross-sectional view of a display device according to an embodiment.

Specifically, FIGS. 1 to 3 illustrate a display device, which comprises a display unit (400) and a cover window (300) disposed on the display unit (400), wherein the cover window comprises a polyamide-imide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outer position of the display device to thereby protect the display unit.

The cover window (300) may comprise a polyamide-imide-based film and a functional layer. The functional layer may be at least one selected from the group consisting of a hard coating, a reflectance reducing layer, an antifouling layer, and an antiglare layer. The functional layer may be coated on at least one side of the polyamide-imide-based film.

The polyamide-imide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-imide-based film according to an embodiment may be excellent in optical properties in terms of high transmittance, low haze, and low yellow index, as well as may have excellent mechanical properties such as modulus and flexibility, and the change (deterioration) of its optical and mechanical properties can be suppressed when it is exposed to UV rays Specifically, the polyamide-imide-based film having an rSE value in the above range is improved in adhesion to a functional layer and light resistance to UV light sources, whereby its quality is uniform, and it can have excellent mechanical properties and optical properties.

As a result, when the polyamide-imide-based film is applied to a cover window for a display device or a display device, the quality reliability and product yield of a final product can be enhanced.

Process for Preparing a Polyamide-Imide-Based Film

An embodiment provides a process for preparing a polyamide-imide-based film.

The process for preparing a polyamide-imide-based film according to an embodiment comprises polymerizing a diamine compound, a dianhydride compound, and a dicarbonyl compound in an organic solvent to prepare a polyamide-imide-based polymer solution (S100); casting the solution and then drying it to prepare a gel sheet (S200); and thermally treating the gel sheet (S300) (see FIG. 4), wherein the process comprises, before casting the polyamide-imide-based polymer solution, stirring the solution.

The process for preparing a polyamide-imide-based film according to some embodiments may further comprise adjusting the viscosity of the polyamide-imide-based polymer solution (S110), aging the polyamide-imide-based polymer solution (S120), and/or degassing the polyamide-imide-based polymer solution (S130).

The polyamide-imide-based film is a film in which a polyamide-imide-based polymer is a main component. The polyamide-imide-based polymer is a resin that comprises an imide repeat unit and an amide repeat unit at a predetermined molar ratio as a structural unit.

In the process for preparing a polyamide-imide-based film, a polymer solution for preparing the polyamide-imide-based polymer may be prepared by simultaneously or sequentially mixing a diamine compound, a dianhydride compound, and a dicarbonyl compound in an organic solvent in a reactor, and reacting the mixture (S100).

In an embodiment, the polymer solution may be prepared by simultaneously mixing and reacting a diamine compound, a dianhydride compound, and a dicarbonyl compound in an organic solvent.

In another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

Details on the diamine compound, the dianhydride compound, and the dicarbonyl compound are as described above.

The content of solids contained in the polymer solution may be 10% by weight to 30% by weight. Alternatively, the content of solids contained in the polymer solution may be 15% by weight to 25% by weight, but it is not limited thereto.

If the content of solids contained in the polymer solution is within the above range, a polyamide-imide-based film can be effectively produced in the extrusion and casting steps.

In another embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.5 molar equivalent, 0.01 to 0.4 molar equivalent, or 0.01 to 0.3 molar equivalent, based on 1 mole of the polyamic acid, but it is not limited thereto.

The further addition of the catalyst may expedite the reaction rate and enhance the chemical bonding force between the repeat unit structures or that within the repeat unit structures.

In an embodiment, the step of preparing the polymer solution may further comprise adjusting the viscosity of the polymer solution (S110). The viscosity of the polymer solution may be 80,000 cps to 500,000 cps, 100,000 cps to 500,000 cps, 150,000 cps to 500,000 cps, 150,000 cps to 450,000 cps, 200,000 cps to 450,000 cps, 200,000 cps to 400,000 cps, or 200,000 cps to 350,000 cps at room temperature. In such an event, the film-forming capability of a polyamide-imide-based film can be enhanced, thereby enhancing the thickness uniformity.

Specifically, the step of preparing the polymer solution may comprise simultaneously or sequentially mixing and reacting a diamine compound, a dianhydride compound, and a dicarbonyl compound in an organic solvent to prepare a first polymer solution; and further adding the dicarbonyl compound to prepare a second polymer solution having the target viscosity.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds may be different from each other. For example, the stirring speed when the first polymer solution is prepared may be faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

In another embodiment, at least one selected from the group consisting of a filler, a blue pigment, and a UVA absorbent may be added to the polymer solution.

Details on the types and contents of the filler, blue pigment, and UVA absorber are as described above. The filler, blue pigment, and UVA absorber may be mixed with the polyamide-imide-based polymer in the polymer solution.

Specifically, the step of preparing a polyamide-imide-based polymer solution may further comprise adding a filler dispersed in an organic solvent. For example, the step of adding a filler dispersed in an organic solvent may be carried out by adding it to the organic solvent before the polymer solution is prepared, adding it in the course of preparing a polyamide-imide-based polymer, or adding it after the first polymer solution is prepared, or after the second polymer solution is prepared, when the step of adjusting the viscosity is carried out.

According to an embodiment, the step of preparing a polyamide-imide-based polymer solution comprises adding a filler dispersed in an organic solvent, and the filler has a diameter (D50) of 50 nm to 1,000 nm as dissolved in an organic solvent. The diameter (D50) of the filler as dissolved in an organic solvent may be 50 nm or more, 70 nm or more, 80 nm or more, or 100 nm or more, and it may be 1,000 nm or less, 800 nm or less, 700 nm or less, 500 nm or less, 400 nm or less, 300 nm or less, 250 nm or less, 220 nm or less, or 200 nm or less. More specifically, it may be 50 nm to 300 nm, 50 nm to 250 nm, 80 nm to 250 nm, 80 nm to 220 nm, 100 nm to 220 nm, or 100 nm to 200 nm.

In some embodiments, the polymer solution or the polymer solution whose viscosity has been adjusted may be aged (S120).

The aging may be carried out by leaving the polymer solution at a temperature of −20° C. to 20° C., −20° C. to 10° C., −20° C. to 5° C., −20° C. to 0° C., or −20° C. to −5° C., for 24 hours or longer. In such an event, the polyamide-imide-based polymer or unreacted materials contained in the polymer solution, for example, may complete the reaction or achieve chemical equilibrium, whereby the polymer solution may be homogenized. The mechanical properties and optical properties of a polyamide-imide-based film formed therefrom may be substantially uniform over the entire area of the film.

In an embodiment, the process may further comprise degassing the polyamide-imide-based polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-imide-based film thus produced.

If both the step of aging the polyamide-imide-based polymer solution (S120) and the step of degassing the polyamide-imide-based polymer solution (S130) are carried out, the step of degassing the polyamide-imide-based polymer solution (S130) may be carried out after the step of aging the polyamide-imide-based polymer solution (S120), or the step of aging the polyamide-imide-based polymer solution (S120) may be carried out after the step of degassing the polyamide-imide-based polymer solution (S130). Alternatively, the step of aging the polyamide-imide-based polymer solution (S120), the step of degassing the polyamide-imide-based polymer solution (S130), and the step of aging the polyamide-imide-based polymer solution (S120) may be sequentially carried out.

According to an embodiment, a step of stirring the solution may be carried out before the polymer solution is cast, which will be described later.

The step of stirring the solution may be carried out at a rotation speed of 120 rpm to 500 rpm. The step of stirring the solution may be carried out at a rotation speed of 120 rpm to 450 rpm, 120 rpm to 400 rpm, 150 rpm to 400 rpm, 150 rpm to 350 rpm, 200 rpm to 350 rpm, or 200 rpm to 300 rpm.

The step of stirring the solution may be carried out at a temperature of 0° C. to 25° C., 0° C. to 20° C., 3° C. to 20° C., 3° C. to 15° C., 3° C. to 12° C., 3° C. to 10° C., 5° C. to 10° C., or 6° C. to 8° C.

The step of stirring the solution may be carried out after the step of preparing the polyamide-imide-based polymer solution (S100).

Specifically, the step of stirring the solution may be carried out after the steps of preparing a polyamide-imide-based polymer solution (S100), adjusting the viscosity of the polyamide-imide-based polymer solution (S110), aging the polyamide-imide-based polymer solution (S120), and/or degassing the polyamide-imide-based polymer solution (S130).

More specifically, a step of stirring the solution in a mixer located above the casting die may be carried out before the polymer solution is cast.

The mixer may comprise a stirring shaft and an impeller coupled to the stirring shaft.

The impeller of the mixer may be a paddles blade, a dispersing homogenizer blade, a propeller, an anchor blade, a gate blade, a ribbon blade, a screw type, a brumagin type, a turbine blade, a curved blade paddle, a spiral propeller blade, or a flat blade turbine type, but it is not limited thereto. For example, the impeller of the mixer may be a paddles blade. More specifically, the impeller of the mixer may be a paddle type in which blades are formed in multiple stages, but it is not limited thereto.

The filler contained in the polyamide-imide-based polymer solution may have a diameter (D50) of 500 nm to 3,000 nm after the solution is stirred. Specifically, the diameter (D50) of the filler contained in the polyamide-imide-based polymer solution may be 500 nm or more, 700 nm or more, 800 nm or more, or 1,000 nm or more, and it may be 3,000 nm or less, 2,800 nm or less, or 2,500 nm or less, after the solution is stirred.

The polyamide-imide-based polymer solution after the solution is stirred corresponds to a polymer solution to be cast, which will be described later.

As the stirring step is performed under the above stirring conditions, the rSE value of the polyamide-imide-based film may be controlled to the above range, and when it is subjected to a post-process such as hard coating, adhesion to the hard coating layer is improved; thus, the phenomenon of delamination of the hard coating layer when applied to a product can be significantly reduced. In addition, excellent adhesion with the hard coating layer can be maintained with almost no decrease in adhesion even after irradiation with a UV light source for a specific time.

In addition, as the diameter (D50) of the filler contained in the polyamide-imide-based polymer solution after the solution is stirred satisfies the above range, the rSE value of the polyamide-imide-based film can be controlled to a specific range, and the quality reliability and product yield of a final product such as a cover window for a display device or a display device to which the film has been applied can be enhanced.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 80,000 cps to 500,000 cps at room temperature as described above. As the viscosity satisfies the above range, the polymer solution can be cast to a uniform thickness without defects, and a polyamide-imide-based film having a substantially uniform thickness can be formed without local/partial thickness variations during drying.

The polymer solution is cast and then dried at a temperature of 60° C. to 150° C., 70° C. to 150° C., or 80° C. to 150° C., for 5 minutes to 60 minutes to prepare a gel sheet. Specifically, the polymer solution is dried at a temperature of 70° C. to 140° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-imide-based film (S300).

The thermal treatment of the gel sheet may be carried out, for example, through a thermosetting device.

The step of thermally treating the gel sheet comprises thermal treatment through at least one heater.

In addition, the step of thermally treating the gel sheet may further comprise thermal treatment with hot air.

In an embodiment, the step of thermally treating the gel sheet comprises thermal treatment with hot air; and thermal treatment through at least one heater.

In an embodiment, if the thermal treatment with hot air is carried out, heat may be uniformly supplied. If heat is not uniformly supplied, a satisfactory surface roughness cannot be achieved, or the surface quality may not be uniform, and the surface energy may be raised or lowered too much.

The thermal treatment with hot air may be carried out in a temperature range of 60° C. to 500° C. for 5 minutes to 200 minutes. Specifically, the thermal treatment of the gel sheet may be carried out in a temperature range of 80° C. to 350° C. at a temperature elevation rate of 2° C./min to 80° C./min for 10 minutes to 150 minutes.

In such an event, the initial temperature of the thermal treatment of the gel sheet may be 60° C. or higher. Specifically, the initial temperature of the thermal treatment of the gel sheet may be 80° C. to 180° C. In addition, the maximum temperature in the thermal treatment may be 200° C. to 500° C.

In addition, the thermal treatment of the gel sheet may be carried out in two or more stages. Specifically, the thermal treatment of the gel sheet with hot air may be carried out sequentially in a first hot air treatment stage and a second hot air treatment stage. The temperature in the second hot air treatment stage may be higher than the temperature in the first hot air treatment stage.

In an embodiment, the step of thermally treating the gel sheet may comprise thermal treatment through at least one heater, specifically, thermal treatment through a plurality of heaters.

The at least one heater may comprise an IR heater. However, the type of the at least one heater is not limited to the above example and may be variously changed.

Specifically, the plurality of heaters may comprise an IR heater. More specifically, a first heater, a second heater, and a third heater may each comprise an IR heater.

The thermal treatment by the at least one heater may be carried out in a temperature range of 300° C. or higher. Specifically, the thermal treatment by the at least one heater may be carried out for 1 minute to 30 minutes in a temperature range of 300° C. to 500° C.

Subsequently, after the step of thermal treatment of the gel sheet, a step of cooling the cured film may be carried out while it is moved.

The step of cooling the cured film while it is moved may comprise a first temperature lowering step of lowering the temperature at a rate of 100° C./minute to 1,000° C./minute and a second temperature lowering step of lowering the temperature at a rate of 40° C./minute to 400° C./minute.

In such an event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried out in such a multistage manner, it is possible to have the physical properties of the cured film further stabilized and to maintain the optical properties and mechanical properties of the film achieved during the curing step more stably for a long period of time.

In addition, a step of winding the cooled cured film using a winder may be carried out.

In such an event, the ratio of the moving speed of the gel sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.01 to 1:1.10, but it is not limited thereto.

If the ratio of the moving speeds is outside the above range, the mechanical properties of the cured film may be impaired, and the flexibility and elastic properties may be deteriorated.

In the process for preparing a polyamide-imide-based film, the thickness variation (%) according to the following Relationship 1 may be 3% to 30%. Specifically, the thickness variation (%) may be 5% to 20%, but it is not limited thereto.

$$\text{Thickness variation (\%)} = (M1-M2)/M2 \times 100 \qquad \text{[Relationship 1]}$$

In Relationship 1, M1 is the thickness (μm) of the gel sheet, and M2 is the thickness (μm) of the cooled cured film at the time of winding.

The polyamide-imide-based film is prepared by the preparation process as described above such that it is excellent in mechanical properties, as well as it is excellent in adhesion to a hard coating layer and light resistance to a UV light source, whereby it is possible to achieve a highly reliable quality. As the polyamide-imide-based film has excellent quality of appearance even when exposed to a backlight or outdoor sunlight, it may be applicable to various uses. For example, the polyamide-imide-based film may be applied to not only display devices but also solar cells, semiconductor devices, sensors, and the like.

Details on the polyamide-imide-based film prepared by the process for preparing a polyamide-imide film are as described above.

EMBODIMENTS FOR CARRYING OUT THE INVENTION

Hereinafter, the above description will be described in detail by referring to examples. However, these examples are set forth to illustrate the present invention, and the scope of the present invention is not limited thereto.

Example 1

A temperature-controllable reactor was charged with dimethylacetamide (DMAc) as an organic solvent at 20° C. under a nitrogen atmosphere. Then, 2,2'-bis(trifluoromethyl)-4,4'-diaminobiphenyl (TFMB) as an aromatic diamine was slowly added thereto and dissolved.

Subsequently, 2,2'-bis(3,4-dicarboxyphenyl) hexafluoropropane dianhydride (6-FDA) was slowly added thereto, followed by stirring for 1 hour.

Then, terephthaloyl chloride (TPC) was added, followed by stirring for 1 hour. And isophthaloyl chloride (IPC) was added in an amount of 94% by mole of the total amount introduced, followed by stirring for 1 hour, thereby preparing a first polymer solution.

The viscosity of the first polymer solution thus prepared was measured. If the measured viscosity did not reach the target viscosity, an IPC solution in a DMAc organic solvent at a concentration of 10% by weight was prepared and added to the first polymer solution, followed by stirring for 30 minutes. This procedure was repeated until the viscosity became 200,000 cps, thereby preparing a second polymer solution.

In addition, a solution of barium sulfate (solids content of 18.2%) dispersed in a DMAc organic solvent was added to the second polymer solution such that the content of filler in the film was 1,500 ppm based on the total weight of solids content of the polyamide-imide-based polymer, followed by stirring for 1 hour.

Subsequently, the second polymer solution was transferred to a tank and stored at −10° C. It was degassed for 1.5 hours so that the pressure in the tank reached 0.3 bar. The tank was purged with nitrogen gas at an internal pressure of 1.5 atm. Upon the purging, the second polymer solution was stored in the tank for 30 hours.

Thereafter, the second polymer solution was cast on a stainless steel belt while it was stirred in a mixer (a paddle-type impeller with multi-stage blades) located above the casting die at a temperature of 6° C. and a rotation speed of 200 rpm. It was then dried with hot air of 80° C. for 30 minutes to prepare a gel-sheet.

Then, while the gel-sheet was conveyed, it was heated in a temperature range of 80° C. to 350° C. at a temperature elevation rate of 2° C./minute to 80° C./minute, followed by thermal treatment at the highest temperature for about 25 minutes. Thereafter, a first temperature lowering step was carried out by lowering the temperature at a rate of about 800° C./minute, followed by a second temperature lowering step by lowering the temperature at a rate of about 100° C./minute, thereby obtaining a film, which was wound using a winder. In such an event, the conveying speed of the gel-sheet on the belt at the time of drying was 1 m/s. The speed of the winder was controlled such that the ratio of the moving speed of the gel-sheet on the belt at the time of drying to the moving speed of the film at the time of winding was within the range of 1:1.01 to 1:1.10.

The specific composition and molar ratio of the polyamide-imide-based polymer are described in Table 1 below.

Examples 2 to 6 and Comparative Examples 1 to 3

Films were each prepared in the same manner as in Example 1, except that the composition and molar ratio of the polymer, the type and content of the filler, the stirring conditions, and the like were changed as shown in Table 1 below.

Evaluation Example

The films prepared in the Examples and Comparative Examples were each measured and evaluated for the following properties. The results are shown in Table 1 below.

Evaluation Example 1: Measurement of Transmittance and Haze

The light transmittance and haze were measured using a haze meter NDH-5000W manufactured by Nippon Denshoku Kogyo in accordance with the JIS K 7136 standard.

Evaluation Example 2: Measurement of Yellow Index

The yellow index (YI) was measured with a spectrophotometer (UltraScan PRO, Hunter Associates Laboratory) under the conditions of d65 and 10° in accordance with the ASTM-E313 standard.

Evaluation Example 3: Measurement of Particle Diameter (D50) of the Filler in the Polymer Solution A sample (a polymer solution comprising a filler, and a polymer solution to be cast after stirring) was diluted with a DMAc solvent at a weight ratio of 50:1. The particle size of the filler was measured three times using a Horiba LB-550 instrument at a cell holder temperature of 25° C. for 60 seconds. Table 1 shows the average value of the three measurements.

Evaluation Example 4: Measurement of Contact Angle and Surface Energy

The surfaces of the polyamide-imide-based films of the Examples and Comparative Examples were cleaned. Then, an MSA (mobile surface analyzer) of KRUSS was placed on the surface, and the contact angle of water, the contact angle of diiodomethane, and the surface energy were calculated by the OWRK method. The same measurement was repeated 5 times, and the average of three measurements excluding the uppermost and lowermost values was calculated. These measurements were conducted on each of the first side (belt side) and the second side (air side) of the polyamide-imide-based film and are shown in Table 1 below.

Evaluation Example 5: Measurement of Adhesion of a Hard Coating Layer 5-1: Preparation of a Polyamide-Imide-Based Composite Film 54.32 parts by weight of a urethane acrylate oligomer (PU9800, Miwon Specialty Chemical), 23.28 parts by weight of a polyfunctional acrylate monomer (M300, Miwon Specialty Chemical), 19.4 parts by weight of a silica sol (MA-ST, Nissan Chemical) in which fine silica particles (average particle diameter: 10 nm to 15 nm) were dispersed in methanol in 30% by weight, and 3 parts by weight of a photoinitiator (I-184, BASF) were compounded with a stirrer to prepare a composition for forming a hard coating.

Thereafter, 100 parts by weight of methyl isobutyl ketone as a solvent was added thereto based on 100 parts by weight of the solids content of the composition for forming a hard coating, which was stirred and then applied to the second side (air side) of the polyamide-imide-based film prepared in the Examples and Comparative Examples by a die coating method. Subsequently, it passed through a drying chamber at 80° C. to dry the solvent for about 1 minute and then cured by irradiating an ultraviolet ray of a high-pressure mercury lamp at a light dose of 1,000 mJ/cm$^2$, thereby forming a coating film with a thickness of 5 μm.

5-2: Evaluation of Adhesion (Cross-Hatch Test)

The adhesion was evaluated in accordance with the ASTM D3359 evaluation method. Specifically, a cross-hatch cutter (107-1542 of Elcometer) was vertically erected on the surface of the composite film sample on which a hard coating layer had been formed, and a certain force was conducted to evaluate the adhesion of the hard coating layer. The results are shown in the column after UV irradiation in Table 1.

TABLE 1

|  |  | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|---|
| Diamine compound (Molar ratio) | | TFMB 100 | TFMB 100 | TFMB 100 | TFMB 100 | TFMB 100 | TFMB 100 | TFMB 100 | TFMB 100 | TFMB 100 |
| Dianhydride compound (Molar ratio) | | 6FDA 7 | 6FDA 7 | 6FDA 7 | 6FDA 7 | 6FDA 11 BPDA 34 | 6FDA 11 BPDA 34 | 6FDA 7 | 6FDA 7 | 6FDA 7 |
| Dicarbonyl compound (Molar ratio) | | TPC 71 IPC 22 | TPC 71 IPC 22 | TPC 71 IPC 22 | TPC 71 IPC 22 | TPC 55 | TPC 55 | TPC 71 IPC 22 | TPC 71 IPC 22 | TPC 71 IPC 22 |
| Filler type | | $BaSO_4$ | $BaSO_4$ | $BaSO_4$ | $SiO_2$ | $BaSO_4$ | $SiO_2$ | $BaSO_4$ | $SiO_2$ | $BaSO_4$ |
| Filler content (ppm) | | 1,500 | 1,500 | 1,000 | 1,500 | 1,500 | 1,500 | 1,500 | 1500 | 1,500 |
| Stirring conditions | Rotation speed (rpm) | 200 | 300 | 200 | 200 | 200 | 200 | 100 | 100 | 0 |
|  | Process temp. (° C.) | 6 | 8 | 6 | 6 | 6 | 6 | 2 | 2 | 2 |
| D50 of the filler in the polymer solution (nm) | | 1,328.3 | 1,131.6 | 1,218.6 | 2,047.2 | 1,872.7 | 2,231.8 | 5,357.1 | 3,485.8 | 5,522.1 |
| Contact angle (°) | Water Air side (Ap2) | 74.38 | 73.67 | 73.78 | 78.44 | 75.63 | 80.98 | 89.1 | 87.18 | 91.4 |
|  | Water Belt side (Apt) | 74.26 | 76.73 | 79.16 | 75.1 | 74.82 | 78.05 | 80.98 | 76.58 | 81.29 |
|  | dAp | 0.12 | 3.06 | 5.38 | 3.34 | 0.81 | 2.93 | 8.12 | 10.6 | 10.11 |
|  | DII Air side (Ad2) | 43.97 | 40.48 | 44.07 | 43.08 | 42.84 | 44.18 | 63.08 | 56.5 | 62.81 |
|  | DII Belt side (Ad1) | 41.49 | 38.28 | 42.25 | 43.89 | 42.26 | 44.93 | 44.18 | 42.57 | 43.28 |
|  | dAd | 2.48 | 2.2 | 1.82 | 0.81 | 0.58 | 0.75 | 18.9 | 13.93 | 19.53 |
| Surface energy (dyne) | Air side (second side) SE2 | 43.62 | 45.26 | 43.84 | 42.38 | 43.55 | 41.04 | 30.03 | 33.59 | 29.45 |
|  | Belt side (first side) SE1 | 44.63 | 44.91 | 42.47 | 43.36 | 44.11 | 41.77 | 41.04 | 43.28 | 41.32 |
|  | rSE | 1.023 | 0.992 | 0.969 | 1.023 | 1.013 | 1.018 | 1.367 | 1.288 | 1.403 |
| Evaluation of adhesion | Before UV irradiation | 5B | 5B | 5B | 5B | 5B | 5B | 4B | 4B | 4B |
|  | After UV irradiation | 4B | 5B | 5B | 4B | 4B | 4B | 2B | 3B | 2B |
| Tt/Hz (%) | | 88.4/0.3 | 88.4/0.4 | 88.5/0.2 | 88.1/0.6 | 88.7/0.4 | 88.7/0.5 | 88.3/0.7 | 88.1/1.0 | 88.3/0.8 |
| YI | | 1.8 | 1.8 | 1.9 | 2.5 | 2.7 | 2.8 | 1.9 | 2.1 | 2.2 | applied to draw it from top to bottom. The sample was then rotated 90 degrees and drawn from top to bottom in the same manner once again. Here, the force was applied such that only the hard coating layer was cut, while the polyamide-imide-based films according to the Examples and Comparative Examples were not cut. The surface of the composite film was cleaned using a brush, and a tape was attached to the cross-cut surface. After the tape was quickly removed, it was checked whether the hard coating layer was detached.

Here, it was evaluated as 5 B if 0% was detached, 4 B if greater than 0% to 5% was detached, 3 B if greater than 5% to 15% was detached, 2 B if greater than 15% to 35% was detached, 1 B if greater than 35% to 65% was detached, and 0 B if greater than 65% was detached. The results are shown in Table 1 below.

Evaluation Example 6: Evaluation of Light Resistance

The adhesion of a hard coating layer was evaluated by the method according to Evaluation Example 5. The results are shown in the column before UV irradiation in Table 1. The side of the polyamide-imide-based composite film on which a hard coating layer had been formed was irradiated with a UV ray having a wavelength of 340 nm at a dose of 0.63 W/m$^2$ and a temperature of 60° C. for 72 hours. Then, the cross-hatch test according to Evaluation Example 5-2 was conducted to evaluate the adhesion of the hard coating layer. The results are shown in the column after UV irradiation in Table 1.

Referring to FIG. 1, in the films according to the Examples in which the rSE value (surface energy of the first surface/surface energy of the second surface) was adjusted to 0.8 to 1.25, the adhesion to a hard coating layer was 5 B or higher before UV irradiation and 4 B or higher after UV irradiation when the cross-hatch test was carried out, confirming that they are excellent in adhesion and light resistance.

Explanation of Reference Numerals

100: polyamide-imide-based film
101: first side
102: second side
200: functional layer
300: polyamide-imide-based composite film,
    cover window
400: display unit
500: adhesive layer

The invention claimed is:
1. A polyamide-imide-based film, which comprises a polyamide-imide-based polymer and has an rSE value of 0.8 to 1.25 as represented by the following Equation 1,

$$rSE = SE1/SE2 \qquad \text{<Equation 1>}$$

in Equation 1, SE1 is the surface energy (dyne/cm) of a first side of the film, and SE2 is the surface energy (dyne/cm) of a second side of the film, wherein the polyamide-imide-based film has a dAd value of 13° or less as represented by the following Equation 3, $$dAd=|Ad2-Ad1| \qquad \text{<Equation 3>}$$

in Equation 3, Ad1 is the contact angle (°) of diiodomethane to the first side of the film, and Ad2 is the contact angle (°) of diiodomethane to the second side of the film, wherein the polyamide-imide-based film is a film prepared by a process comprising:

polymerizing a diamine compound, a dianhydride compound, and a dicarbonyl compound in an organic solvent to prepare a polyamide-imide-based polymer solution;

casting the solution and then drying it to prepare a gel sheet; and thermally treating the gel sheet, wherein the process comprises, before casting the polyamide-imide-based polymer solution, stirring the solution, wherein the step of stirring the solution is carried out at a temperature of 0° C. to 25° C. and at a rotation speed of 120 rpm to 500 rpm, wherein the step of preparing a polyamide-imide-based polymer solution comprises adding a filler dispersed in an organic solvent, and the filler has a diameter (D50) of 50 nm to 1,000 nm as dissolved in an organic solvent, and the filler contained in the polyamide-imide-based polymer solution has a diameter (D50) of 500 nm to 3,000 nm after the solution is stirred.

2. The polyamide-imide-based film of claim 1, wherein SE1 is 35 dynes/cm to 60 dynes/cm, and SE2 is 35 dynes/cm to 60 dynes/cm.

3. The polyamide-imide-based film of claim 1, which has a dAp value of 8° or less as represented by the following Equation 2:

$$dAp=|Ap2-Ap1| \qquad \text{<Equation 2>}$$

in Equation 2, Ap1 is the contact angle (°) of water to the first side of the film, and Ap2 is the contact angle (°) of water to the second side of the film.

4. The polyamide-imide-based film of claim 1, wherein the contact angle (Ap1) of water to the first side of the polyamide-imide-based film is 60° to 83°, and the contact angle (Ap2) of water to the second side of the polyamide-imide-based film is 60° to 85°.

5. The polyamide-imide-based film of claim 1, wherein the contact angle (Ad1) of diiodomethane to the first side of the polyamide-imide-based film is 30° to 50°, and the contact angle (Ad2) of diiodomethane to the second side of the polyamide-imide-based film is 30° to 55°.

6. The polyamide-imide-based film of claim 1, which further comprises at least one selected from the group consisting of a filler, a blue pigment, and a UVA absorber.

7. The polyamide-imide-based film of claim 1, wherein the polyamide-imide-based polymer comprises an imide-based repeat unit and an amide-based repeat unit at a molar ratio of 2:98 to 70:30.

8. A process for preparing the polyamide-imide-based film of claim 1, which comprises:

polymerizing a diamine compound, a dianhydride compound, and a dicarbonyl compound in an organic solvent to prepare a polyamide-imide-based polymer solution;

casting the solution and then drying it to prepare a gel sheet; and thermally treating the gel sheet, wherein the process comprises, before casting the polyamide-imide-based polymer solution, stirring the solution, wherein the step of stirring the solution is carried out at a temperature of 0° C. to 25° C. and at a rotation speed of 120 rpm to 500 rpm, wherein the step of preparing a polyamide-imide-based polymer solution comprises adding a filler dispersed in an organic solvent, and the filler has a diameter (D50) of 50 nm to 1,000 nm as dissolved in an organic solvent, and wherein the step of preparing a polyamide-imide-based polymer solution comprises adding a filler dispersed in an organic solvent, and the filler contained in the polyamide-imide-based polymer solution has a diameter (D50) of 500 nm to 3,000 nm after the solution is stirred.

9. A polyamide-imide-based composite film, which comprises a polyamide-imide-based film and a functional layer, wherein the polyamide-imide-based film comprises a polyamide-imide-based polymer and has an rSE value of 0.8 to 1.25 as represented by the following Equation 1, $$rSE=SE1/SE2 \qquad \text{<Equation 1>}$$

in Equation 1, SE1 is the surface energy (dyne/cm) of a first side of the polyamide-imide-based film, and SE2 is the surface energy (dyne/cm) of a second side of the polyamide-imide-based film, wherein the polyamide-imide-based film has a dAd value of 13° or less as represented by the following Equation 3, $$dAd=|Ad2-Ad1| \qquad \text{<Equation 3>}$$

in Equation 3, Ad1 is the contact angle (°) of diiodomethane to the first side of the film, and Ad2 is the contact angle (°) of diiodomethane to the second side of the film, wherein the polyamide-imide-based film is a film prepared by a process comprising:

polymerizing a diamine compound, a dianhydride compound, and a dicarbonyl compound in an organic solvent to prepare a polyamide-imide-based polymer solution;

casting the solution and then drying it to prepare a gel sheet; and thermally treating the gel sheet, wherein the process comprises, before casting the polyamide-imide-based polymer solution, stirring the solution, wherein the step of stirring the solution is carried out at a temperature of 0° C. to 25° C. and at a rotation speed of 120 rpm to 500 rpm, wherein the step of preparing a polyamide-imide-based polymer solution comprises adding a filler dispersed in an organic solvent, and the filler has a diameter (D50) of 50 nm to 1,000 nm as dissolved in an organic solvent, and the filler contained in the polyamide-imide-based polymer solution has a diameter (D50) of 500 nm to 3,000 nm after the solution is stirred.

10. The polyamide-imide-based composite film of claim 9, wherein the functional layer further comprises a hard coating layer, when it is subjected to the cross-hatch test, the adhesion between the polyamide-imide-based film and the hard coating layer is 5 B or more, and when the polyamide-imide-based film is irradiated with a UV ray having a wavelength of 340 nm at a dose of 0.63 W/m² and a temperature of 60° C. for 72 hours and then subjected to the cross-hatch test, the adhesion between the polyamide-imide-based film and the hard coating layer is 4 B or more.

11. A display device, which comprises a display unit; and a cover window disposed on the display unit, wherein the cover window comprises a polyamide-imide-based film and a functional layer, and the polyamide-imide-based film comprises a polyamide-imide-based polymer and has an rSE value of 0.8 to 1.25 as represented by the following Equation 1:

$$rSE = SE1/SE2 \quad \text{<Equation 1>}$$

in Equation 1, SE1 is the surface energy (dyne/cm) of a first side of the polyamide-imide-based film, and SE2 is the surface energy (dyne/cm) of a second side of the polyamide-imide-based film, wherein the polyamide-imide-based film has a dAd value of 13° or less as represented by the following Equation 3, $$dAd = |Ad2 - Ad1| \quad \text{<Equation 3>}$$

in Equation 3, Ad1 is the contact angle (°) of diiodomethane to the first side of the film, and Ad2 is the contact angle (°) of diiodomethane to the second side of the film, wherein the polyamide-imide-based film is a film prepared by a process comprising:

polymerizing a diamine compound, a dianhydride compound, and a dicarbonyl compound in an organic solvent to prepare a polyamide-imide-based polymer solution;

casting the solution and then drying it to prepare a gel sheet; and thermally treating the gel sheet, wherein the process comprises, before casting the polyamide-imide-based polymer solution, stirring the solution, wherein the step of stirring the solution is carried out at a temperature of 0° C. to 25° C. and at a rotation speed of 120 rpm to 500 rpm, wherein the step of preparing a polyamide-imide-based polymer solution comprises adding a filler dispersed in an organic solvent, and the filler has a diameter (D50) of 50 nm to 1,000 nm as dissolved in an organic solvent, and the filler contained in the polyamide-imide-based polymer solution has a diameter (D50) of 500 nm to 3,000 nm after the solution is stirred.

* * * * *